(12) United States Patent
Valgora

(10) Patent No.: US 6,334,397 B1
(45) Date of Patent: Jan. 1, 2002

(54) SIDE SHEETS FOR A HOPPER AND BULK CONTAINER CAR

(76) Inventor: G. Gerald Valgora, 1227 Rushbrooke Drive, Oakville, Ontario (CA), L6M 1H8

(*) Notice: Subject to any disclaimer, the term of this patent is extended or adjusted under 35 U.S.C. 154(b) by 0 days.

(21) Appl. No.: 08/766,902

(22) Filed: Dec. 13, 1996

(51) Int. Cl.⁷ .............................................. B61D 17/08
(52) U.S. Cl. ...................................... 105/409; 105/248
(58) Field of Search ............................ 105/407, 406.1, 105/409, 247, 248

(56) References Cited

U.S. PATENT DOCUMENTS

| | | | |
|---|---|---|---|
| 2,150,897 A | * 3/1939 | Nystrom | 105/409 |
| 2,250,538 A | 7/1941 | Kepner et al. | 105/364 |
| 3,789,773 A | * 2/1974 | McNally et al. | 105/248 |
| 4,331,083 A | 5/1982 | Landregan et al. | 105/406 |
| 4,348,047 A | 9/1982 | Harshman et al. | 296/184 |
| 4,352,331 A | 10/1982 | Anderson et al. | 105/248 |
| 4,353,312 A | 10/1982 | Brouwer | 105/241.2 |
| 4,484,528 A | * 11/1984 | Anderson et al. | 105/248 |
| 4,898,101 A | 2/1990 | Harter | 105/247 |
| 5,109,777 A | * 5/1992 | Ohmura et al. | 105/409 |
| 5,613,726 A | * 3/1997 | Hobbs et al. | 105/409 |

* cited by examiner

Primary Examiner—S. Joseph Morano

(57) ABSTRACT

A side sheet assembly for a rail car having a pair of horizontally extending upper and lower side sheets form with a plurality of longitudinally extending strengthening ribs. The upper and lower side sheets are affixed to each other at a horizontal seam to either form flat connection or a rib at the horizontal seam.

11 Claims, 2 Drawing Sheets

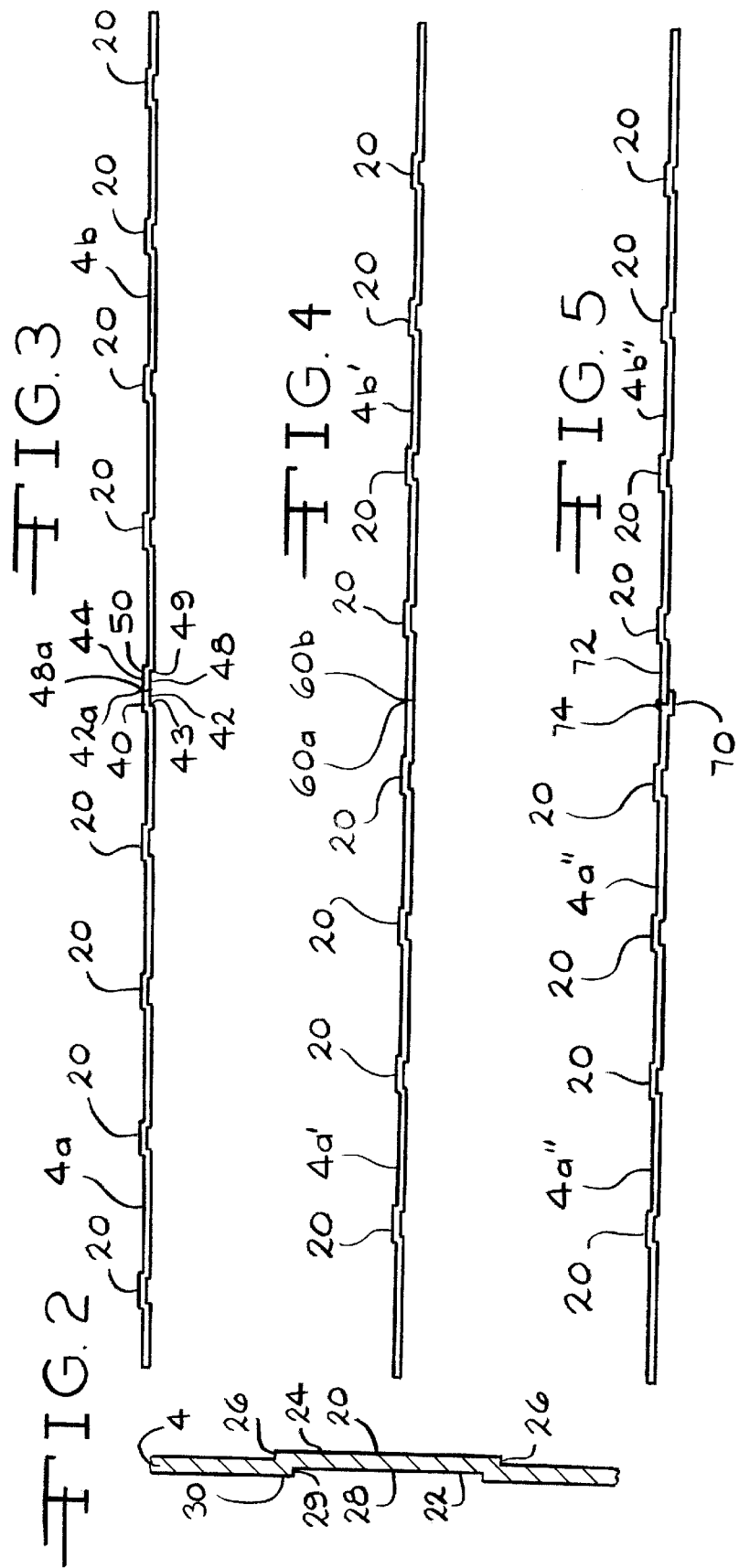

SIDE SHEETS FOR A HOPPER AND BULK CONTAINER CAR

BACKGROUND OF THE INVENTION

1. Field of the Invention

This invention relates in general rail to cars and more particularly to side sheets for a hopper & bulk container rail car.

2. Summary of the Prior Art

Hopper & bulk container cars have long been used to transport granular material, such as, for example, plastic pellets, cement, grain, wood chips and the like. A hopper & bulk container car is provided with a hopper body formed on its sides by a pair of parallel side walls, which may be covered or open. The lading being transported is generally discharged through chutes located beneath the car. In the past, the side walls of a hopper car have been constructed with a plurality of vertical sheets which are vertically welded to each other. In addition, the welded side walls are welded at their top to the hopper top chord and at their bottom to the side sill disposed on opposite sides of the car body. This unit is then welded to the car structure. The employment of multiple side sheets, such as 6 or 8 in number along each side of the car, requires an extensive use of welds to satisfactorily attach the side sheets to the car body and to render the structure adequately strong to resist loading and stresses normally associated with operation of a rail car. The need for such extensive welding of side sheets is time consuming and labor intensive during manufacture of the rail car and adds significant weight to the finished rail car.

In addition, known multiple vertical side sheets produce unsightly imperfections on the exterior of the wall which are referred to as "oil canning." In the past, hopper & bulk container cars have been provided with a plurality of vertical side sheets because of the difficulty in forming elongated horizontal sheets, particularly extending the length of the body as the wall structure. Long sheets of material, such as length wise side sheets, are preferably formed from rolls of coiled metal. As the coiled metal is unreeled, however, the sheets inherently possess a camber whereby the sheets do not come off the coil with a straight configuration and create deviations unsuitable for use on a rail car. Moreover, elongated sheets have heretofore not possessed the desirable rigidity for use as a side wall structure. Accordingly, it is desirable in the rail industry to provide elongated side sheets producing a superior side wall structure having less weight, a better appearance and enhanced rigidity.

SUMMARY OF THE INVENTION

It is therefore an objective of the invention to provide improved side sheets for a hopper & bulk container car in which the side sheets on each side of the car extend horizontally along the length of the hopper compartment. In a preferred embodiment, the invention herein disclosed utilizes a pair of side sheets horizontally arranged along the side of the car and which are welded in securement as a unitary wall structure. The side sheets of the invention allow the problem of coil camber to be controlled by having a plurality of shallow ribs formed in horizontal orientation along their length. The shallow ribs insure a straighter side sheet because the edges are controlled so that a straighter structure is obtained. The use of such horizontal ribs not only eliminates the problem of coil camber, but provides strengthening rigidity to the structure of the side sheets for a stronger hopper car body. The use of horizontally arranged side sheets, such as two in number, greatly eliminates the number of welds which are necessary during manufacture of the side walls of the hopper bulk container car. The reduction in welds permits a more economical fabrication of the rail car with lighter weight side walls. Because the side sheets have straighter edges due to the presence of the horizontal ribs, the side sheets of the invention are readily attachable to the top chord, the side sill, and to each other along a horizontal seam. The side sheets in accordance with the invention are preferably formed by a cold forming process to achieve the foregoing improved results.

BRIEF DESCRIPTION OF THE DRAWINGS

FIG. 2 is an end partial elevational view, parts and section, taken along lines 2—2 of FIG. 1;

FIG. 3 is an end elevational view, with parts and section, taken along lines 3—3 of FIG. 1 and showing a first embodiment of the interconnection between two side sheets;

FIG. 4 is an end elevational view of a second embodiment of the interconnection between two side sheets; and FIG. 5 is an end elevational view of a third embodiment of the interconnection between two side sheets.

DESCRIPTION OF THE PREFERRED EMBODIMENTS

Figure 1:
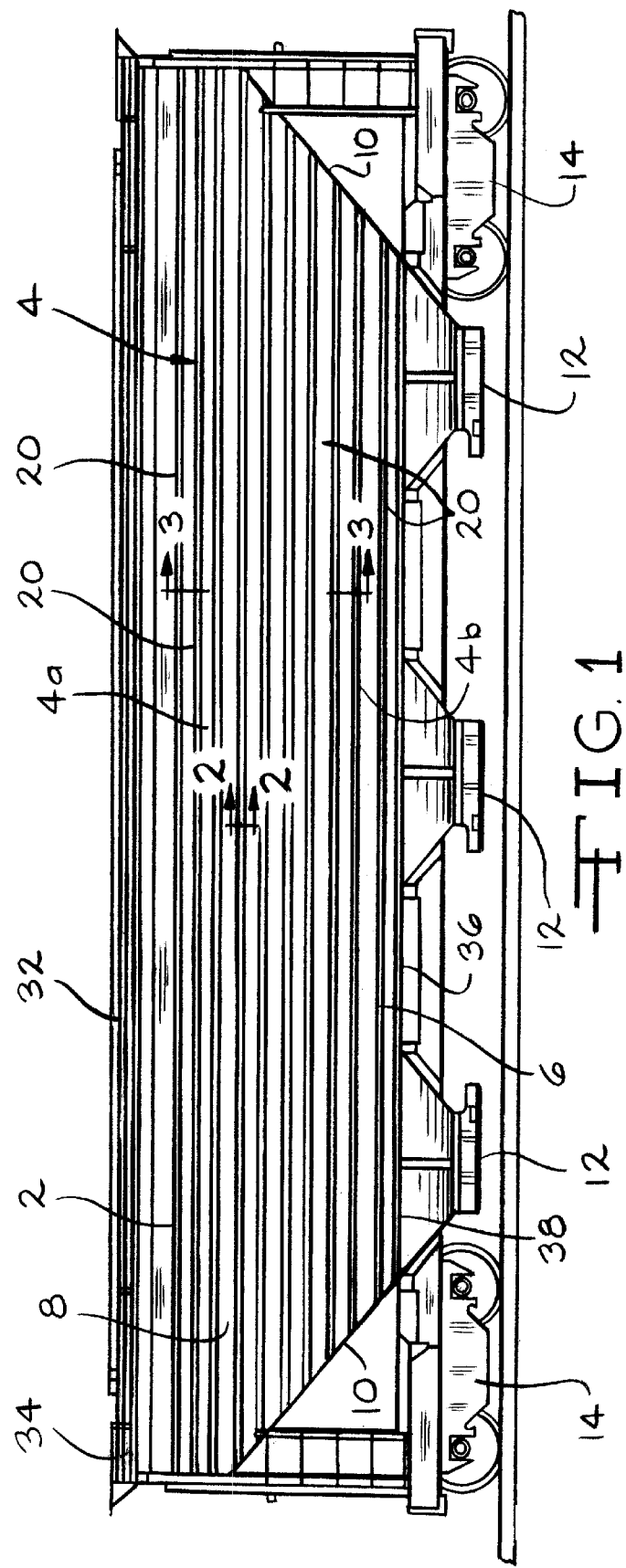
FIG. 1 is a side elevational view of a hopper bulk container car having the improved side sheets of the invention.

Referring now to FIG. 1, there is illustrated a hopper bulk container car generally designated by reference numeral 2 and having the improved side sheets assembly 4 of the invention. As is well known, the hopper bulk car 2 includes a hopper body 6 having a pair of opposed side walls 8 comprising the side sheets 4 of the invention, which include upper side sheet 4a and lower side sheet 4b, and sloped end walls 10 at each end. A plurality of conventional discharge openings 12 are provided at the bottom of the car, and the hopper body 6 is carried by a pair of truck assemblies 14 mounted at each end of the car 2. Although side sheets 4 of the invention are described as forming the side walls of a hopper car 2 as shown in FIG. 1, it is within the scope of the invention to use the side sheets herein disclosed for other rail cars, whether articulated or free standing, in which flat side sheets are used and the advantages of the invention are desirable.

As seen in FIGS. 2 through 5, the side sheets 4 include a plurality of longitudinally extending strengthening ribs 20 which are formed in the sheets by a typical cold working process as the sheets are drawn out from a coiled material, such as aluminum or steel. The ribs 20 extend in parallel relationship to each other. Each of the ribs 20 are formed out of side sheets 4 to produce offset sections 22, which include generally flat rib faces 24 and interconnecting lateral portions 26 extending along the length of the car.

Although not intended to be so limited whereby other dimensions can be used as conditions dictate, rib face 24 may possess a width, as in FIG. 1, of approximately 2½ inches whereby the inner surface 28 of the rib 20 is offset outward extending portion 29 (FIG. 2) from the inner surface 30 of the upper and lower side sheet 4 by a distance of 3/32 of an inch and the like. Although the side sheets 4 may possess other dimensions, it is found that a sheet having a thickness of 0.150±0.005 to 0.250±0.010 is suitable depending on length, gross weight & number of vertical structure members. In use, each of the horizontal sheets 4 may have a height of 56 inches or other dimension reflecting the actual height of the rail car on which they are mounted.

The upper side sheets 4a are welded at their top edge 32 to upper chord 34 on each side of rail car 2. The lower side sheets 4b are welded at the bottom edge 36 to the side sill 38 of rail car 2. Referring to FIG. 3, there is illustrated one technique by which upper side 4a is secured to lower sheet 4b. The lower edge 40 of upper side sheet 4a is formed with an offset edge portion 42 offset at outward portion 43 for a distance less than the thickness of sheet 4a. The upper edge 44 of lower side 4b is provided with a corresponding offset edge portion 48 offset at outward portion 49 for a distance less than the thickness of sheet 4b whereby the edge 42a of offset portion 42 abuts and is welded to the upper edge 48a of offset edge portion 48 by a conventional welding technique. The offset edge portion sheets 4a and 4b create a longitudinally extending reinforcing rib 50 at the horizontal seam whereby the rib 50 has a width approximately the same as the width of ribs 20.

In FIG. 4, a second technique for attaching side sheets 4a' and 4b' together is shown. The lower edge portion 60 of upper sheet 4a' and the upper edge portion 62 of lower sheet 4a" are flat and are not offset as in the embodiment of FIG. 3. The edges 60a and 60b are welded together without forming a rib as in FIG. 3.

In FIG. 5, the bottom edge portion 70 of upper side sheet 4a" is offset and overlaps the flat edge portion 72 of lower side sheet 4b". The edge portions 70 and 72 are welded together to form a rib 74 at the horizontal seam.

In the cold working process, the side sheets are uncoiled and undergo roll forming processes to form the plurality of ribs as shown in FIGS. 2 to 5.

What is claimed is:

1. A side wall for enclosing the length of a side of a load carrying vehicle comprising a side wall formed by a flat side sheet having a plurality of parallel ribs formed thereon by cold working, said side sheet having a length generally equal to the length of the load carrying vehicle and having upper and lower horizontally straight edges, said plurality of ribs extending along the length of the flat sheet for limiting surface deviations of said flat side sheet, said plurality of ribs further preventing deviation in the straightness of said upper and lower edges, said ribs having a flat portion being outwardly offset in generally parallel relationship to said flat sheet by outwardly extending portions, and said ribs being offset for a distance less than the thickness of said flat sheet.

2. The side sheet according to claim 1 wherein said flat sheet is provided with a flat edge portion along its length being offset from said side sheet for forming at least a portion of one of said plurality of ribs.

3. A side sheet assembly for enclosing the side of a rail car comprising side sheet means having a length extending along the length of the rail car, said side sheet means having a flat configuration, said side sheet means having rib means extending along said length of said side sheet means, said side sheet means including an integral flat sheet extending along said side sheets means, said flat sheet forming an outer generally flat surface and having upper and lower straight edges, said rib means includes a plurality of parallel shallow ribs formed on said flat sheet of said side sheet means at a plurality of rows, said plurality of parallel ribs preventing deviations of said flat surface, and said plurality of shallow ribs having an outer portion integrally interconnected to said flat sheet by lateral portions, said flat portion extending lengthwise offset from said side sheet means, and said plurality of parallel ribs acting to prevent surface deviations of said flat sheet and deviation of the straightness of said upper and lower edges.

4. A side sheet assembly for enclosing the side of a rail car comprising side sheet means having a length substantially corresponding to the length of the rail car, said side sheet means having a flat configuration, said side sheet means having rib means extending along said length of said side sheet means, said side sheet means including an integral flat sheet extending said length of said side sheets means, said flat sheet forming an outer generally flat surface, said rib means includes a plurality of parallel ribs formed on said flat sheet of said side sheet means at a plurality of rows, said plurality of parallel ribs preventing deviation of said flat surface, said plurality of ribs form a generally flat portion extending lengthwise offset from said side sheet means, and said flat portion is offset from side sheet means by a distance less than the thickness of said flat sheet of side sheet means.

5. The side sheet assembly according to claim 4 wherein said side sheet means includes upper and lower side sheets extending along said length of said side sheet means, said upper and lower side sheets are affixed to each other at a horizontal seam for forming a unitary structure.

6. The side sheet assembly according to claim 5 wherein said upper and said lower sheets include a plurality of parallel ribs along their length, said plurality of ribs having a predetermined height, said plurality of parallel ribs being spaced by a distance greater than said height.

7. The side sheet assembly according to claim 5 wherein said upper and said lower sheets include a plurality of ribs along their length.

8. A side sheet assembly for enclosing the side of a rail car comprising side sheet means having a length substantially corresponding to the length of the rail car said side sheet means having a flat configuration, said side sheet means having rib means extending along said length of said side sheet means, said rib means includes a plurality of parallel ribs formed on said sheet means, said plurality of ribs form a generally flat portion extending lengthwise offse from said side sheet means, said side sheet means includes an upper and lower side sheets extending along said length of said side sheet means, said upper and lower side sheets are affixed to each other at a horizontal seam for forming a unitary structure, said upper and said lower sheets include a plurality of ribs along their length, and one of said ribs is formed along said horizontal seam at which said upper side sheet and said lower side sheet is affixed.

9. The side sheet assembly according to claim 8 wherein one of said upper and lower side sheets include offset edge portion to overlap the edge portion of the other of said upper and lower side sheets to form an upper longitudinal rib.

10. The side sheet assembly according to claim 8 wherein the lower edge of said upper side sheet and the upper edge of said lower side sheet each include corresponding edge portions at said horizontal seam.

11. A rail car having a load carrying compartment comprising a car body being carried on opposite truck assemblies and forming a load carrying compartment, said car body having a pair of opposed side walls enclosing the load carrying compartment, said opposed side walls each having a plurality of side sheets extending substantially the length of said car body, said plurality of side sheets of each of said opposed side walls being horizontally interconnected, said plurality of side sheets of each of said opposed side walls having a plurality of shallow longitudinally extending ribs forming generally flat offset faces, said plurality of side sheets of each of said opposed side walls includes a upper side sheet disposed above a lower side sheet, each of said upper side sheet and said lower side sheet having a plurality of ribs, said upper side sheet and said lower side sheet being longitudinally interconnected to each other along a longitudinal seam, and rib means formed on said upper side sheet and said lower side sheet adjacent to said seam.

\* \* \* \* \*